Feb. 25, 1936.  J. C. MOCK  2,032,219
WHEELED VEHICLE
Filed Nov. 9, 1932  4 Sheets-Sheet 1
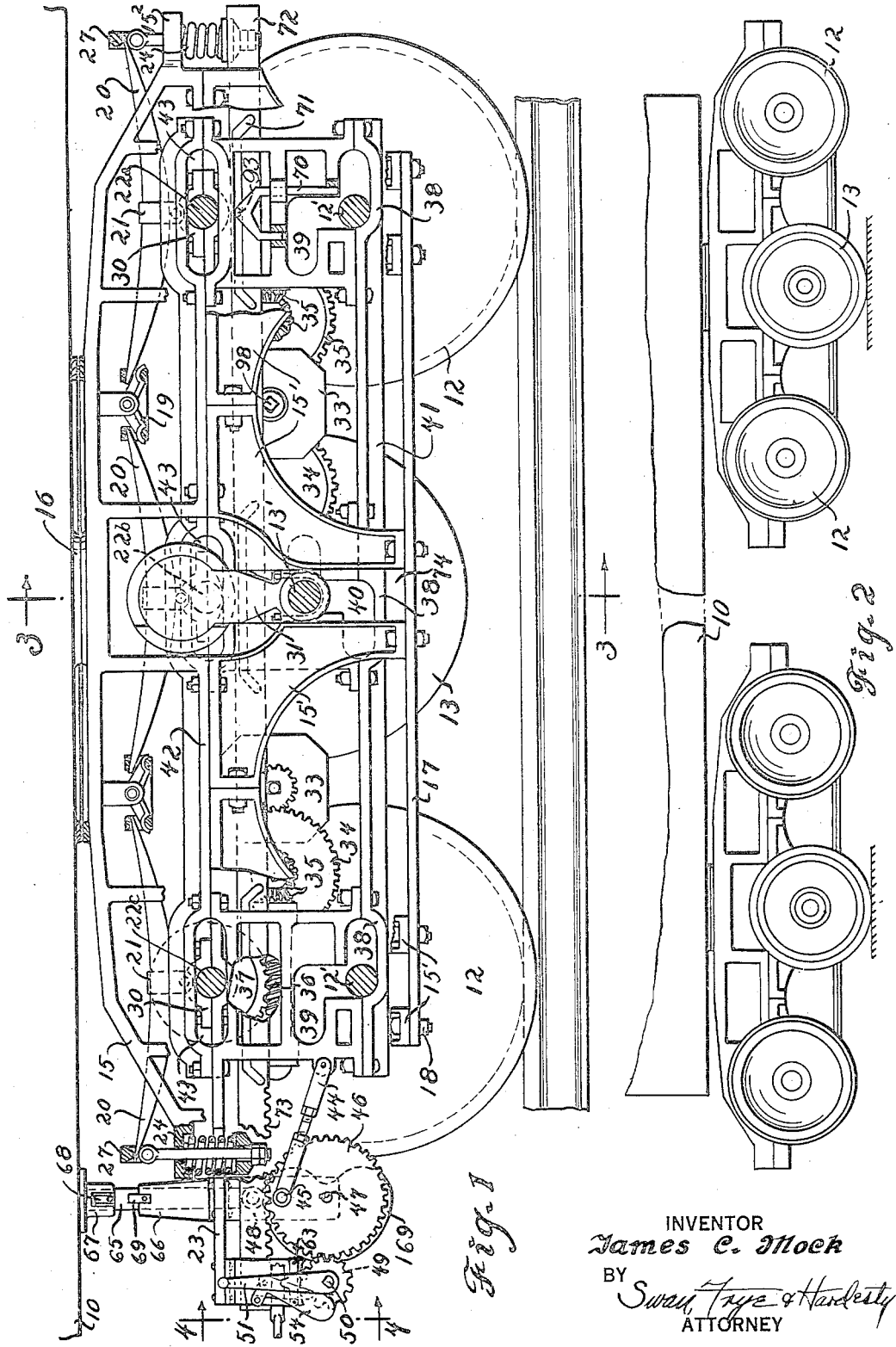
INVENTOR
James C. Mock
BY
Swan, Frye & Hardesty
ATTORNEY

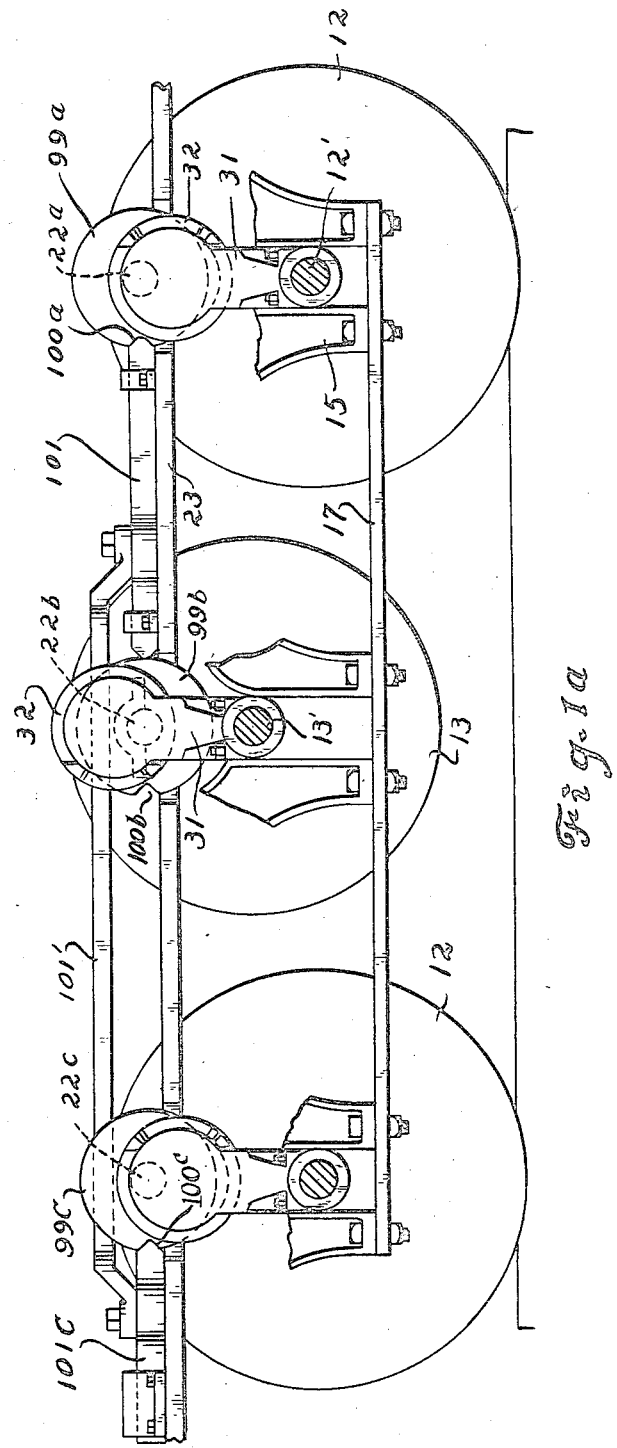

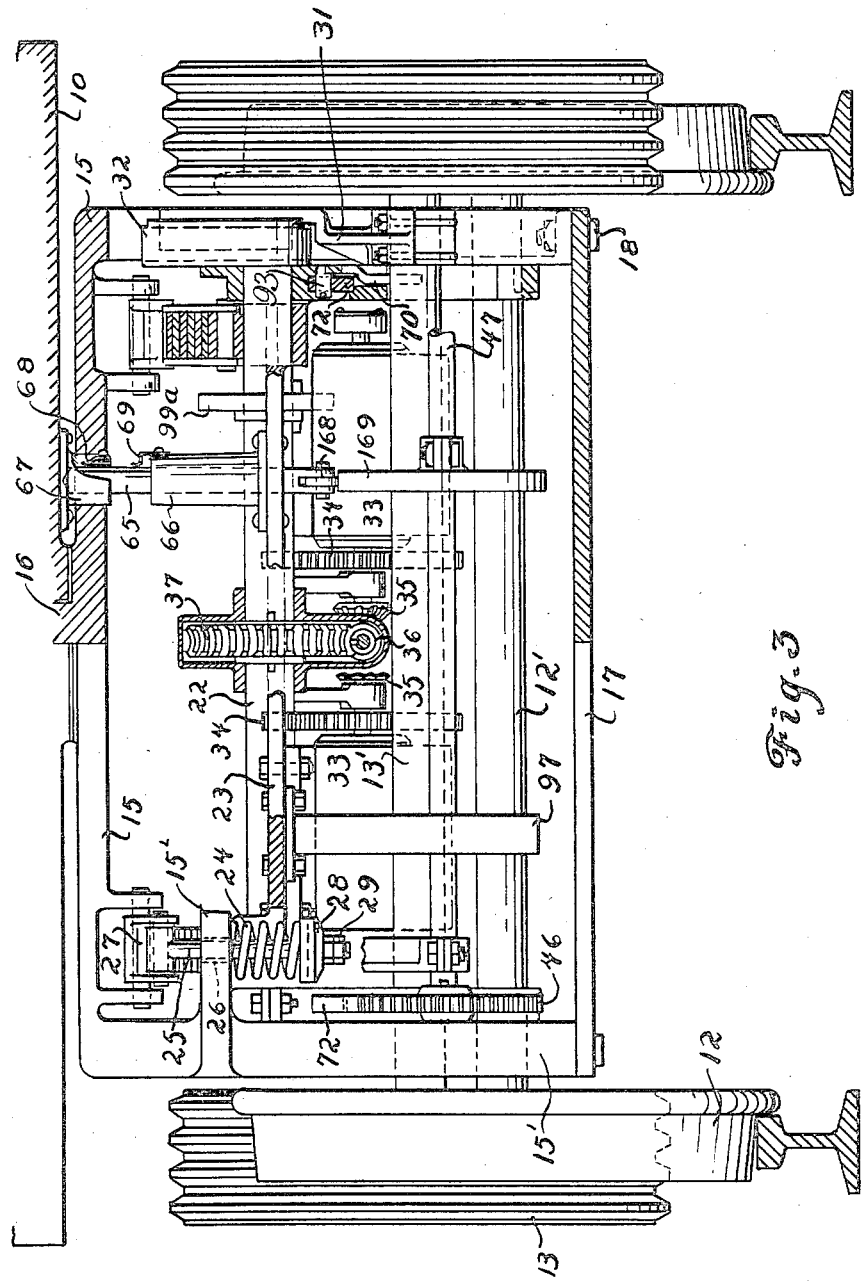

Feb. 25, 1936.    J. C. MOCK    2,032,219
WHEELED VEHICLE
Filed Nov. 9, 1932    4 Sheets-Sheet 4
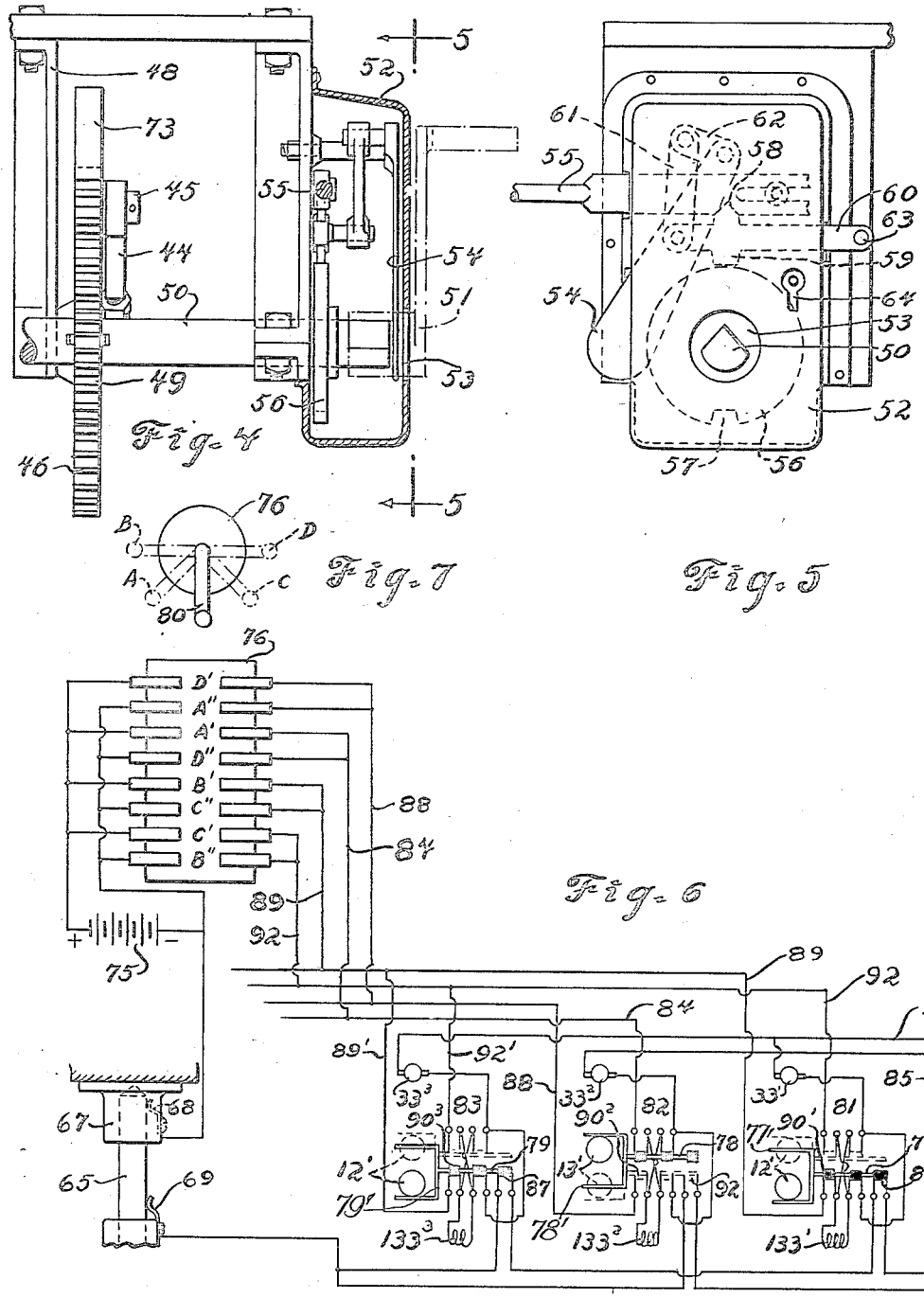
INVENTOR
James C. Mock
BY Swan, Frye & Hardesty
ATTORNEY Patented Feb. 25, 1936

2,032,219

UNITED STATES PATENT OFFICE 2,032,219

WHEELED VEHICLE

James C. Mock, Detroit, Mich.

Application November 9, 1932, Serial No. 641,863

7 Claims. (Cl. 105—215)

This invention relates to wheeled vehicles and railway rolling stock, and more particularly to an improved car truck construction convertible for operation either on or off the rails, so that a car equipped with one or more of the improved trucks may be used not only for rail travel in the conventional manner, but as well in running over highways or the ground.

An important object of the invention is the provision of such a convertible truck incorporating separate wheels for rail and highway travel in which novel means is provided for raising the wheels not in use clear of the ground or rails, or other supporting surface, and for preventing any of such wheels from being raised until all are first in engagement with the supporting surface.

A further object is the provision of novel wheel raising and lowering mechanism so designed that it is never necessary to lift the weight of the vehicle in operating the same, which requires very little power to operate, and which may be motivated manually by one or more motors.

Another object of this invention is the provision of improved locking means to prevent raising or lowering of either the rail or highway wheels unless the brakes of the vehicle are set, and for locking the raised and lowered wheels in their respective positions, in whichever relative positioning they may be.

Still another object is the provision of means to prevent lowering of the highway wheels into operative position unless the truck and car are aligned and parallel, and for holding them rigidly in that relation as long as the road wheels are lowered and the rail wheels elevated.

A still further object is the provision of improved electrical controlling means for regulating the raising and lowering of the wheels, for preventing raising both sets of wheels at once, etc.

Still further objects will readily occur to those skilled in the art upon reference to the following description and the accompanying drawings in which Figure 1 is a view partly in section and partly in side elevation of a truck incorporating the principles of this invention, the same being illustrated attached to a railway car which is fragmentarily shown.

Figure 1a is a fragmentary and more or less diagrammatic side view of part of the truck chassis with the outer spring frame, wheels, etc. removed, bringing out the locking means for preventing simultaneous raising of both rail and highway wheels.

Figure 2 is a fragmentary side view of a rail-highway car incorporating the principles of this invention, showing the same adjusted for highway use and adapted to be attached to a motor tractor or the like, (unshown), by means of which the car may be hauled when off the rails.

Figure 3 is a composite view the left half of which is primarily in end elevation although partly broken away, and the right half of which is a vertical section taken substantially on the line 3—3 of Figure 1 and looking in the direction of the arrows.

Figure 4 is a detail view partly in section and partly in end elevation, taken substantially on the line 4—4 of Figure 1 and looking in the direction of the arrows.

Figure 5 is a detail side view taken substantially on the line 5—5 of Figure 4 and looking in the direction of the arrows.

Figure 6 is a schematic diagram showing the wiring of a preferred arrangement of the electrical controlling and operating apparatus employed in conjunction with the invention, and Figure 7 is a diagrammatic top plan view of the controller.

Referring now to the drawings, reference character 10 designates the body of a car or other wheeled vehicle, which may be in the nature of a railway box car, although its construction and precise nature are unimportant, as my invention primarily concerns itself with mechanism and the control and operation thereof. No attempt has accordingly been made to illustrate or describe the car in detail. The car is preferably of lighter construction than an ordinary railway box car, however, and lighter alloys of aluminum and the like may be used to still further reduce the weight if desired. The car 10 is shown in Figure 2 as equipped at either end with one of my improved trucks, both trucks being shown adjusted for highway or other travel off the rails. The trucks incorporate separate wheels as 12 and 13 for rail and highway travel respectively, the former ordinarily flanged and the latter rubber tired, as shown, and so arranged that either the rail or highway wheels may be lowered into engagement with the supporting surface and the others lifted clear thereof. When the road wheels 13 alone contact the ground, car 10 may be hauled by a tractor (not shown) after the fashion of an ordinary truck trailer, or in any other desired manner, while of course when the rail wheels are lowered and the highway wheels raised the car may be used for rail travel.

Each convertible truck may, as shown, incorporate a sprung frame 15 pivotally secured to the car body as at 16, having side portions 15′, bolted to and extending downwardly therefrom, and a cross bracing member, shown in the form of a plate 17 extending across the legs of the channel or U-sectioned sprung frame member so formed. The bottom plate 17 is here shown secured to the sprung frame by means of nuts and bolts. These, as well as the nuts and bolts securing together the other portions as 15—15′ of the sprung frame, are designated 18. Shackled to the sprung frame 15 as at 19 are semi-elliptic springs 20, to the centers of which are attached securing members 21 which support through the master shafts 22a, 22b, and 22c, the unsprung frame assembly, generally designated 23, which is arranged within the sprung frame. Supplemental compression springs as 24 may be arranged between the outer ends of the front and back semielliptic springs 20 and the frame 15. The upper ends of the supplemental springs engage a suitably formed inwardly projecting supporting portion 15² of the sprung frame, while the lower end of each compression spring is secured to the end of its spring 20 by means of a rod 25 extending upwardly through the spring 24 and an aperture 26 in the member 15² into pivotal engagement with the shackle member 27 carried by the end of the spring 20. The rod carries at its lower end a cap 28 in which the compression spring is seated, and adjustment may be provided by the securing and locking nuts 29 which hold the cap in place.

Half bearings for the shafts 22a, 22b and 22c are formed in the unsprung frame 23, and are completed by bearing caps 30 as bolted to the frame. As shown in Figure 1, one of the master shafts is arranged above each pair of wheels. The wheels are mounted upon axle shafts as 12′—13′, and the axles, and so the wheels are adapted to be raised and lowered by means of pitmen 31, the lower ends of which are loosely secured to the axles immediately inside the wheels while their upper ends engage eccentrics 32 carried by the ends of the master shafts. The eccentrics are of such throw that in a half revolution they raise and lower the wheels 12—13 a desired distance.

Means for turning the master shafts, and so the eccentrics may be carried by the inner or unsprung frame 23. In the construction shown the master shafts are arranged to be driven by electric motors 33 coupled through spur gears 34 and mitre gears 35 to worms 36, each of which drives a worm wheel 37, one of which is fast on each of the master shafts. One such gear train and motor is provided for each master shaft. The motors 33 and this intermediate reducing gearing through which they drive the master shafts are all supported by and journalled in the unsprung frame 23. Electrical means which will presently be described in detail are provided for controlling the operation of the motors 33, and such electrical control may of course be so arranged that all wheels must be lowered before they can be raised, and that only one set of wheels can be raised at one time, thereby preventing the necessity of lifting the car and its load in operating any of the wheels up or down. Switches for assisting in controlling the motor circuits may be mounted in the frame 23 adjacent the axle shafts and arranged to be thrown as the axles approach fully raised and fully lowered positions. The details of construction of such switches are of course unimportant. The casing housing one of the same is shown at 97 in Figure 3. In order to provide for raising and lowering the wheels by hand, the motor shafts may be squared, as at 98 for reception of a crank or wrench (not shown).

Mechanical means may also be provided for locking the axles 12′—13′ and so the wheels in position, to prevent raising or lowering of any of the wheels while the vehicle is in motion as well as to take the vertical load off the pitmen 31. Such means may comprise a series of locking plates 38, one for each of the axles. The locking plates are slotted as at 39—40 for engagement about the axles, and are secured together as by bars 41 to move as a unit. The double bent or substantially Z-shaped slots 39 within which the rail wheel axles 12′ are arranged will be seen to be alike in shape and disposition, while the reverse or generally S shaped slots 40 within which the road wheel axle 13′ travels are so oppositely disposed that the horizontal portions of the slots may lock the road wheels in raised position and the rail wheels in lowered position when the locking plates are slid in a common direction, and vice versa, but cannot lock both at once either in raised or lowered position. When the locking plates are in the central position in which they are shown in Figure 1, the axles may travel vertically in the vertical portions of the slots. It will be seen that the wheels might be locked in the positions in which they are shown by moving the locking plates to the left.

The locking plates are further connected at their upper extremities by bars 42, and in the upper portion of each plate is another slot 43 so that the plates may travel freely longitudinally of the truck without interfering with the master shafts 22a, 22b, and 22c. The slidable locking plate assembly will be seen to be hung from the unsprung portions of the truck, one on each side thereof arranged between the inner or unsprung frame 23 and the side plates 15′ of the outer or sprung frame. Each locking plate assembly is slidable by means of a connecting rod 44 pivotally attached at one extremity to the locking plate assembly and at the other to a crank pin 45 which may be carried by a gear 46 mounted on shaft 47 which is carried by a hanger 48 secured to the unsprung frame 23. Gear 46 may be turned to slide the locking plates by means of a pinion 49 similarly supported by the unsprung frame upon a shaft 50 having a square or otherwise suitably irregular end adapted to receive a wrench or crank 51. As best shown in Figures 4 and 5 the crank-receiving end of the shaft 50 may be enclosed by a housing as 52 suitably apertured as at 53 for reception of the crank, and a pivotal baffle or guard plate 54 may be arranged to swing between the aperture 53 and the squared shaft 50, as shown in Figure 4. The baffle 54 is so connected that when the brake rod 55 is moved to set the brakes of the vehicle, the baffle is moved clear of the aperture 53, while when the rod is moved to release the brakes the baffle is moved to block the aperture 53 and prevent insertion of the crank. The rod 55 is of course connected to the usual or any desired brake rigging (not shown) with which the vehicle may be provided.

Fast on the shaft 50 is arranged a disc 56, in the periphery of which is a slot 57, so arranged that when uppermost it lies opposite another slot 58 in the rod 55 when that rod is in brake-set position. Vertically reciprocable between the slots is a dog 59 having an upper end adapted to fit in the slot 58 and a lower end adapted to fit in the slot 57, and of such length that there is not room for the dog between the disc and the rod 55 unless one or the other of the slots is in alignment with the dog, and so connected to the vane 54, as by means of the dog-carrying lever 60, link 61, and the lever arm 62 attached to the vane, that when the portion 59 is out of the slot 57, and the arm 60 so raised, the vane is swung to the non-interfering position in which it is shown in Figure 5; to which non-interfering position it will be seen to be swingable, however, only when the slot 58 is in alignment with the dog, which occurs, as above stated, only when the rod 55 is in the position it occupies when the brakes are set. The lever arm 60 is pivoted on a fixed pin 63.

Thus with the mechanism in the position shown in Figures 1 and 5, the rod 55 being in the brake-set position and the vane 54 swung clear of the squared shaft, manipulation of the crank 51 in a manner to turn the crank pin 45 a quarter turn counterclockwise will result in moving the locking plates to the left to secure the axles in their shown position, and would also put the slot 57 in uppermost position and in alignment with the bottom of the dog 59, which would then drop into the slot. The vane 54 will then fall to a position in which it covers the crank hole 53 as soon as the crank is removed, and the brake rod 55 is freely movable under normal operation of the brakes, being then no longer held in set position, but it will be seen that save when the rod is in brake-set position the dog cannot be moved upwardly to release the vane and the crank shaft and so permit manipulation of the sliding locking plates. When in such position however, the arm 60 may be lifted to swing the vane clear of the crank hole, as by means of a key (not shown) which may be inserted in the casing 52 through the keyhole 64 for engagement therewith.

It is of course necessary, when the rail wheels are lowered and the device arranged for rail haulage that the truck be free to swivel with respect to the car, whereas when the road wheels are lowered and the rail wheels raised to enable using the device as a trailer, at least one truck must be locked against swiveling with respect to the body. This result may be obtained by means of the locking pin 65, which is slidable in a cylindrical supporting boss 66, carried by the unsprung frame 23. The upper end of the rod may be projected into the socket 67 fastened to the under side of the car body only when the truck and body are parallel. The rod 65 projects downwardly through the frame 23, carrying at its lower extremity a cam follower in the form of a roller 168. The rod is adapted to be raised and lowered by the cam 169, mounted on the shaft 47 which also carries the gear 46 locking plate actuating crank 45. The cam is so contoured that when the shaft 47 is turned to move the locking plates to the locked position they occupy when the rail wheels are lowered and the road wheels raised, the rod 65 is lowered clear of socket 67, and the truck is accordingly free to swivel, while when the shaft 47 is turned to move the locking plates to any other position, the rod 65 is forced upwardly into the socket 67 and locks the truck in longitudinal alignment with the car body. It will be obvious that the plunger cannot be forced into the socket, and accordingly the locking plates cannot be moved from the position in which they hold the rail wheels down and the road wheels up, unless the truck and body are in alignment, thus preventing use of the road wheels with the truck loose. The electrical circuit through the motor used for actuating the road wheels is arranged to be broken when the plunger is out of the socket 67, the contacts 68—69 being arranged in that circuit and constituting a safety switch adapted to be completed by the plunger 65, the contact 68 being arranged in the socket 67 and the contact 69 being mounted on the supporting boss 66 and slidably contacting the rod 65. This switching arrangement further prevents accidental lowering of the road wheels while the truck is free to swivel in a manner which will presently be more particularly described in connection with the electrical controlling system. To further lock the axles 12'—13' in position in the horizontal portions of the slots 39—40 in the locking plates, there may be provided vertically slidable locking members 70, generally of inverted U-shape, adapted to be vertically reciprocated by cam slots 71 and followers 93 carried by the locking members and engaging therein. The cam slots are formed in a horizontally slidable bar 72 carried by the unsprung frame 23 and having formed upon its end adjacent the locking plate actuating mechanism just described a rack 73, meshing with the gear 46 in such manner that upon turning the gear a quarter turn in either direction from the position in which it is shown in Figure 1 (that is, to lock the rail and highway wheels in either relative positioning) the locking members 70 are free to drop into the downturned ends of the slots 71, until they project into the slots 39—40 between the axles and the vertical portions of such slots, thus holding the axles in the ends of the horizontal portions of these slots.

As shown in Figure 1 the slide plate members 15' of the sprung frame are arranged to form vertical slots as 74 in which the axles 12'—13' may slide when being raised or lowered by the pitmen 31, while at the upper ends of each such slot the frame members are cut away to allow swinging of the pitmen while following their eccentrics.

Also fast on each of the master shafts 22a, 22b and 22c is preferably arranged a disc as 99a, 99b, 99c, peripherally kerfed or slotted as at 100a, 100b, 100c. The discs are concentric and the slots have tapering sides and are similarly positioned therein, as shown in Fig. 1a. Between the two discs 99a—99b is arranged a slidable locking bar 101 having ends tapered to fit in the slots and of such length that it is free to move only when the slots are in opposed aligned relation; while it holds the shaft carrying the disc in whose slot it is engaged immovable until the slots are so aligned, preventing movement of both shafts at once. Thus with the rail wheels lowered and road wheels raised, as shown in Fig. 1a, it is impossible to change the positioning of the master shaft 22a to raise the rail wheels until master shaft 22b has been turned a half revolution to lower the highway wheels, at which time the slot 100b is aligned with the locking bar 101, after which shaft 22a may be turned to raise the rail wheels, movement of disc 99a forcing the locking bar to the left and its farther end into slot 100b under the cam action of the sloping sides of slot 100a upon upon the tapered end of the bar. It will be seen that thereafter shaft 22b cannot be turned to raise the road wheels until the rail wheels have been lowered by turning the shaft 22a and disc to again put the slot 100a in the shown position, permitting turning of the disc 100b and movement of the locking bar to the right. There is thus provided a positive mechanical lock preventing simultaneously upward retraction of the wheels, and assuring that at least one pair shall always be lowered to support the weight of the car. Simultaneous locking of the other pair of rail wheels may be provided by the auxiliary locking bar 101c, connected to the locking bar 101 for movement as a unit therewith, as by the connecting bar 101', and engageable with a slot 100c in disc 99c only when bar 101 is engaged in slot 100a.

For controlling the three direct current motors by means of which the rail and highway wheels and axles are ordinarily raised and lowered, there is preferably provided some such controlling arrangement as is schematically shown in Figure 6, in which 33' and 33³ represent the commutators of the motors used to raise and lower the rail wheels, and 33² the commutator of the motor used to raise and lower the road wheels; reference characters 133', 133², and 133³ correspondingly representing the field of each. A source of direct current is indicated by the battery 75, between which and the several motors contacts are adapted to be completed by a controller generally designated 76. The several axles 12'—13' are also diagramatically shown in this figure together with the contact carrier members 77—78—79 of the switches, 81, 82, 83 respectively, which are actuated in response to raising and lowering of the axles. Each contact carrier carries three contacts (generally undesignated but clearly shown in Fig. 6) adapted to close the appurtenant pairs of adjacent contacts when in either raised or lowered position. No attempt has been made to show the mechanical features of construction of the switches, which might obviously take any of various well known forms. They are arranged to be thrown, however, by vertical movements of the axles, as by means of yokes 77', 78', 79' connected to the contact carriers and having spaced arms engageable by the axles as they near the ends of their vertical travel.

The switches may be enclosed in casings as 97 mounted adjacent the axles in general as indicated in Figure 3.

When the handle 80 of the controller, shown in plan in Fig. 7, is moved to the position designated "A" in that view, it closes contacts A' and A" to lower the highway wheels. Since these wheels are initially raised however, (as indicated in Figure 6 by the positioning of the axle 13') the circuit through contacts A" from the negative battery terminal is broken at switch 82 by the raising of the contact carrier 78 and dead-ending of the lead connected to conductor 88. The circuit through the motor field 133² is completed from the positive terminal of the battery 75 through contacts A', wire 84, and reversing switch 82, the current passing from the field 133² to the commutator 33² through the central contact of contact carrier 78, and being completed back to the negative battery terminal through wire 85, the end contacts 86—87 of contact carriers 77—79 (switches 81—83, which are closed by reason of the lowered positioning of the axles 12') and through the contacts 68—69 to the battery. When the axle 13' reaches the lowered position, but not until then, the contact carrier 78 is moved to the down position. It then opens the motor circuit by dead-ending the wire 84 from the positive battery terminal simultaneously reversing the field by the appurtenant reversing switch portion 82 to effect dynamic braking. Normally the next operation is to raise the rail wheels. This is done by moving the controller to position B (Fig. 6) in which it closes contacts B'—B". The motors for moving rail axles 12' are controlled by switches 81 and 83, in the same manner in which switch 82 controls the road wheel motor. A description of the manner in which one of these switches functions in controlling the raising of one pair of wheels will accordingly suffice to indicate the manner of controlling not only both pairs of rail wheels, but the highway wheels as well. Considering the circuit of switch 81, shown on the right in Figure 6, the parts of and connected to which will be seen to be like and arranged similarly to those comprising and controlled by switch 83, it will be seen that the field of the motor is designated 133', and the commutator 33'. Closing the contacts B'—B" energizes the field and commutator portions of the rail wheel motors, the fields and so the motors, being reversed, however, to raise the wheels. The current flows from the positive battery terminal through contacts B' and wires 89 to the left hand contact 90' of contact carrier 77 whence it flows directly through the field 133', then the middle switch contact, commutator 33' and back to the negative battery terminal through wire 91, contacts 92 of switch 82, which contacts are then closed, and safety contacts 68—69. This raises the rail wheels and throws the contact carriers 77—79 back to the dotted raised positions, breaking the circuit by dead-ending the positive line 89 at contacts 90'.

In lowering the rail wheels the controller is moved to a position C in which it closes contacts C'—C", reversely energizing the same motors controlled by switches 81—83 through wires 92—92', in the same manner described in connection with lowering the road wheels under the control of switch 82. It will be apparent that during this operation the contact carrieres 77—79 are raised, contact carrier 78 lowered. The current passes from the positive terminal of the battery through contacts C' and lines 92—92' to the left hand switch contacts, reversing switch, fields 133', 133³, central contact arm switch contacts, commutators 33'—33³ and back to the negative battery terminal through wire 91, contact 92 of switch 82, and contacts 68—69.

In moving the road wheels up, the operation of the circuit with respect to switch 82 is the same as it is with relation to switch 81—83 in raising the rail wheels in the manner previously described. The controller is placed in position D, in which it closes contacts D'—D", the contact carrier 78 of switch 82 being initially in lowered position, as are also contact carriers 77 and 79 of switches 81 and 83. The circuit through the field and commutator 133²—33² of the motor controlled by switch 82 for lifting the road wheels is completed through contacts D' from the positive terminal of the battery through wire 88 to switch contact 90², whence it flows directly through the field 133² without passing through the reversing switch, central switch contact, commutator 33², and back to the negative battery terminal through switch contacts 86 and 87 of switches 81—83, and safety switch 68—69. When the axle travel is completed and the switch thrown, the line 88 from the positive battery terminal is dead-ended at contact 90².

It is believed that the operation of the construction will be apparent from the foregoing description, but it might briefly be summarized as follows: When the car reaches the end of a rail run, the wheels being in the positions in which they are shown in Figure 3, with the locking plate assembly in the left rather than the central position, however, and the locking bars 70 lowered to hold the axles in the ends of the horizontal portions of slots 39—40, the baffle 54 guarding crank-hole 53, and locking pin 65 clear of socket 67 by reason of the least-diametered portion of the heart-shaped cam 69 being uppermost, and it is desired to shift the wheels, the brakes are first set, thereby aligning slots 58 (Fig. 5) with the dog 59. The key is then inserted in keyhole 64, and the lever 60 lifted, thereby swinging the vane 54 free of the crank hole 53. The crank is then inserted and turned until the locking plate assembly is in the central position shown, with the vertical portions of the slots in alignment with the axles. In so adjusting the truck which is to be at the rear in the road haulage, this also forces pin 65 into socket 67, thus closing the circuit to the road wheel elevating motor at this point and locking the truck against swiveling, whereas in so adjusting the truck which is to be at the front in the road haulage the pin 65 may be removed and the switch contacts 68—69 shorted, or the plunger 65 otherwise rendered inoperative, so that the car may be hauled over the road by means of a draw bar or other suitable draft rigging attached to the truck thus left free to swivel. With either truck under consideration, however, the controller handle 80 is next turned to position A, lowering the road wheels, and then to position B to raise the rail wheels, after which the crank handle is turned to turn the crank 45 another quarter turn in the same direction, moving the locking plate assembly to the extreme right hand position and so locking the rail wheels in the up and the road wheels in the down position. At this time the auxiliary locking members 70 again fall, the followers dropping into the depressed portions at the other ends of the slots 71, and slot 57 is again aligned with the dog 59, allowing the dog to fall into the slot and the vane 54 to cover the crank hole as soon as the crank is removed, after which, by means of a tractor or the like, the car may be hauled to its desired destination off the rails.

The hauling arrangement is of course optional and might be varied to suit the convenience or conditions of service, for example both trucks might be locked against swiveling and the road wheels arranged upon steering knuckles after the fashion of the usual motor car and truck front axle construction and steered in any desired way, either by a separate operator and steering gear or by connection to the drawbar. So also but one of the convertible trucks might be used and a non-convertible rail truck of more conventional construction used for rail travel, while for road travel the end of the car so borne might be lifted from the rail truck and swively attached to the rear end of a tractor adapted also to support the same, which likewise is a common method of haulage well known in the art and requiring no further elaboration.

When it is desired to again place the car on the rails, the convertible truck or trucks are reversely adjusted; the baffle 54 of each is swung out of the way when the brakes are set in like manner, and the crank handle is applied and turned to rotate crank pin 45 a quarter turn in the opposite direction, again releasing the locking plates by moving them to the central position shown. The controller is moved to position C to lower the rail wheels, and then to position D to raise the road wheels. The crank handle is turned to complete a half revolution of the crank pin, sliding the locking plate assembly all the way to the left, to lock the rail wheels down and the road wheels up, also allowing pin 65, if the truck was locked thereby against swiveling, to fall from socket 67 by again turning the least-diametered portion of cam 69 uppermost, and aligning plate 54 with dog 59, so that the crank hole guard plate 54 falls over the slot as soon as the crank handle is removed. As soon as both trucks are so adjusted, or the other end of the car is again placed on a truck suited for rail travel, if only one convertible truck is used, and the car placed on the rails, the car is again in condition for railway use.

Now having described the invention and the preferred embodiments thereof, it is to be understood that said invention is to be limited, not to the specific details herein set forth, but only by the scope of the claims which follow:

What I claim is:

1. A wheeled vehicle convertible for travel on or off rails, comprising a body, a truck supporting the same, a plurality of axles carried by the truck, a pair of flanged wheels carried by one of said axles, a pair of unflanged wheels carried by another, means for independently raising and lowering each of said axles and the wheels carried thereby, and journaling and supporting means for suspending the vehicle from either pair of axles when lowered.

2. A convertible truck for supporting a wheeled vehicle for travel on or off rails, comprising flanged and unflanged wheels and axles independently connecting wheels of each type, an unsprung frame, vertically movable members supported by the unsprung frame and carrying the axles, means also carried by the unsprung frame for moving said members to raise and lower the axles, a sprung frame, and guide members for insuring vertical movement of the axles carried by the sprung frame.

3. A convertible truck for supporting a wheeled vehicle for travel on or off rails, comprising flanged and unflanged wheels, axles independently connecting wheels of each type, an unsprung frame, vertically movable members supported by the unsprung frame and carrying the axles, means also carried by the unsprung frame for moving said members to raise and lower the axles, slidable locking members also carried by the unsprung frame for securing the axles in raised or lowered position, a sprung frame, and guide members for insuring vertical movement of the axles carried by the sprung frame.

4. In a wheeled vehicle convertible for travel on or off rails, a body, a truck supporting the same and normally free to swivel relatively thereto about a substantially vertical axis, locking means for securing the truck and body against such relative swiveling and in aligned relation, a plurality of axles carried by the truck, flanged wheels carried by one of said axles, unflanged wheels carried by another, means for independently raising and lowering each of the axles and the wheels carried thereby, and means for preventing lowering of the unflanged wheels when said truck locking means is in unlocked position.

5. In a wheeled vehicle convertible for travel on or off rails, a body, a truck supporting the same and normally free to swivel relatively thereto about a substantially vertical axis, locking means for securing the truck and body against such relative swiveling and in aligned relation, a plurality of axles carried by the truck, flanged wheels carried by one of said axles, unflanged wheels carried by another, electrically actuatable means for selectively raising and lowering each of said wheel and axle assemblies independently, and circuit-breaking means incorporated with said locking means for preventing energization of the lowering means for the unflanged wheels when said locking means is unlocked.

6. In a wheeled vehicle convertible for travel on or off rails, a body, a truck supporting the same and normally free to swivel relatively thereto about a substantially vertical axis, locking means for securing the truck and body against such relative swiveling and in aligned relation, a plurality of axles carried by the truck, flanged wheels carried by one of said axles, unflanged wheels carried by another, a slidable locking member for simultaneously securing one of the axles in raised and the other in lowered position and vice versa, common actuating means for said locking means, arranged to release said truck locking means when said axle locking means secures the axle carrying the flanged wheels in lowered and the axle carrying the unflanged wheels in raised position.

7. In a wheeled vehicle convertible for travel on or off rails and incorporating brake rigging, a body, a truck supporting the same, a plurality of axles carried thereby, flanged wheels carried by one of said axles, unflanged wheels carried by another, means for independently raising and lowering each of said wheel and axle assemblies, means for locking said wheel and axle assemblies against raising and lowering movement and for securing the wheels of one type in raised while the others are in lowered position, and vice versa, and guard means for preventing actuation of said locking means when the brake rigging is in brake-released position.

JAMES C. MOCK.